United States Patent [19]

Smith

[11] Patent Number: 4,573,900

[45] Date of Patent: Mar. 4, 1986

[54] EVACUATION SYSTEM FOR INJECTION MOLDING MACHINES

[75] Inventor: Lyle Smith, Danbury, Conn.

[73] Assignee: Alpha Molding Technologies Associates, Danbury, Conn.

[21] Appl. No.: 679,053

[22] Filed: Dec. 6, 1984

[51] Int. Cl.⁴ .............................................. B29F 1/00
[52] U.S. Cl. ................................ 425/157; 425/405 R; 425/155; 425/584; 425/546; 425/556; 425/437
[58] Field of Search ................... 425/155, 157, 405 R, 425/437, 546, 584

[56] References Cited

U.S. PATENT DOCUMENTS

| | | | |
|---|---|---|---|
| 3,452,397 | 7/1969 | Newton | 425/157 X |
| 4,019,845 | 4/1977 | Birkhofer et al. | 425/156 X |
| 4,125,247 | 11/1978 | Gabrys | 425/405 R X |
| 4,185,952 | 1/1980 | Hewitt | 425/405 R X |
| 4,412,804 | 11/1983 | Hüther | 425/155 X |

*Primary Examiner*—J. Howard Flint, Jr.
*Attorney, Agent, or Firm*—Joseph R. Carvalko, Jr.

[57] ABSTRACT

An apparatus is disclosed for controlling operating pressure within a mold cavity of an injection molding die. Finely detailed, and parts having thin walls are molded with the invention providing a process for eliminating defects. There is a pressure control apparatus which is preset to provide varying degrees of negative and positive pressure during the mold cycle, and to reset to repeat the procedure for subsequent cycles. The procedure includes a cleaning stage for preparing the mold cavity for the following mold cycle.

8 Claims, 11 Drawing Figures

Fig. 8. DEEP SECTION EJECTOR PIN

EVACUATION SYSTEM FOR INJECTION MOLDING MACHINES

BACKGROUND OF THE INVENTION

1. Field of The Invention

The present invention generally relates to an apparatus for controlling operating pressure during predetermined increments of time in a mold cycle for producing intricate, and/or thin walled parts within a cyclical injection molding die operatively associated with an injection molding machine.

Injection molding of plastic parts in an injection molding machine has been in wide use throughout the world for the past three decades, and is presently one of the most commonly used ways of rapidly fabricating complex plastic parts in large quantity. There is an increasing need to produce plastic parts with greater tolerance control, better quality and with increased production rates to comply with ever increasing demand. This means that it is essential to eliminate any potential loss of parts in the molding process due to gas burns and imperfect surface detail. In addition, there is an increasing need to mold highly complex and intricately detailed parts having critical tolerances and otherwise perfect detail for medical and electronic applications. For example within the medical field, maintaining very critical tolerances with absolutely no imperfections is essential with certain highly detailed, and thin walled parts.

The present invention has been developed to provide such intricate parts through application of an apparatus which eliminates blemishes, gas burns, voids and other imperfections present in the injection molding process's known to date. There is included with the present invention an apparatus which virtually eliminates reject parts through a novel process which divides up the mold cycle in increments with varying degrees of applied vacuum and positive air pressure applied to the mold cavity under predetermined lengths of time.

2. Description of the Prior Art

The idea of applying a vacuum by means of a vacuum pump or vacuum reservoir to a mold cavity is not new. For example, there is a U.S. Pat. No. 4,412,804, issued to Huther on Nov. 1, 1983 which demonstrates how to utilize a vacuum source, as connected to the mold cavity of an injection molding die for forming ceramic parts. This patent teaches that it is possible to have a vacuum source 100 to 1000 times greater than the volume of the mold, and to have a closed-circuit evacuating system to achieve production of precision parts of ceramic material. The ceramic parts having more uniform composition by removing air bubbles present in the molten material through the application of the vacuum.

While the above named patent reaches toward the production of ceramic parts having increased perfection, it is not demonstrated in the patent how to maintain the mold clean, prevent distortion of the parts during ejection from the mold and to provide high production runs of highly intricate and thin walled parts such as those previously described in the field of the present invention. It is for this reason that the present invention is provided, and will teach what has not been done heretofor.

SUMMARY OF THE INVENTION

There is disclosed an apparatus for controlling operating pressure during predetermined increments of time in a mold cycle for producing intricate, and thin walled plastic parts. The parts are formed during a mold cycle of a cyclical injection molding die operatively associated with an injection molding machine. The apparatus includes a mold cavity located between a mating male and female die member of the cyclical injection molding die. The mold cavity has an inlet port for receiving a heated thermoplastic material. There is a sealing device for achieving an airtight bond between the mating male and female die member during the mold cycle when the cyclical injection molding die is closed. There is a venting path including a valve for operatively applying a sustained negative pressure to the mold cavity during a first time interval beginning after the cyclical injection molding die has closed and before the cyclical injection molding die has filled with the heated thermoplastic material. A first control device is utilized for maintaining a substantially constant negative pressure within the mold cavity during the first time interval of the mold cycle while the intricate, thin walled parts are being formed. A second control device is utilized for instantly reversing the substantially constant negative air pressure to a positive air pressure and for maintaining the positive air pressure at a level sufficiently high enough during a second adjustable time interval of the mold cycle to cause a predetermined incremental and uniform separation of the intricate, thin walled plastic parts from the male and female die member at a predetermined increment of time substantially close to that portion of time in the mold cycle when the cyclical injection molding die initially opens. And there is a device for resetting the first and second control devices to an initial condition whereupon a succeeding mold cycle will be started.

The apparatus, including the second control device for instantly reversing the substantially constant negative air pressure has a positive air supply connected to the mold cavity of the injection molding die. The positive air supply is connected to a first and second pneumatic supply line. A pressure gauge is connected to the second pneumatic supply line for monitoring the positive air pressure. A pressure regulator is connected to the second supply line for regulating the positive air pressure during the second time interval. And, there is a device for adjusting the second time interval to a second predetermined time interval such that the positive air pressure supply is applied to the mold cavity when the second electromagnetic solenoid valve opens at the end of the second predetermined time interval while the first electromagnetic solenoid valve is closing.

Therefore, having briefly described the present invention in the foregoing summary, it is here now presented that it is an object of the invention wherein it is intended that the apparatus disclosed provides a control over the degree of vacuum to be applied to a mold cavity during the initial part forming stages of the injection molding process in an injection molding die.

It is a further object of the present invention to provide a control device for adjusting the time that the vacuum is to be applied to the mold cavity discussed above.

And it is another object of the present invention to provide a regulated positive air pressure to the mold cavity discussed heretofore to cause a incremental and uniform separation of the molded parts from the female and male die members.

It is yet another object of the present invention to provide a control device for adjusting the level of positive air pressure to be applied to the mold cavity, and further to provide a control device for adjusting the length of time that the positive air pressure is applied to the mold cavity so as to ensure thorough cleansing of the mold cavity.

And, a further object of the present invention is to provide a control apparatus for molding fine, intricate, and thin walled plastic parts or any combination thereof which are free of blemishes, voids, and other undesired marks otherwise caused by hot gases in the mold cavity.

And, it is yet a further object of the present invention to provide an apparatus which cleans the mold vents during that portion of the mold cycle when the mold is open.

DESCRIPTION OF THE INVENTION

Figure 1:
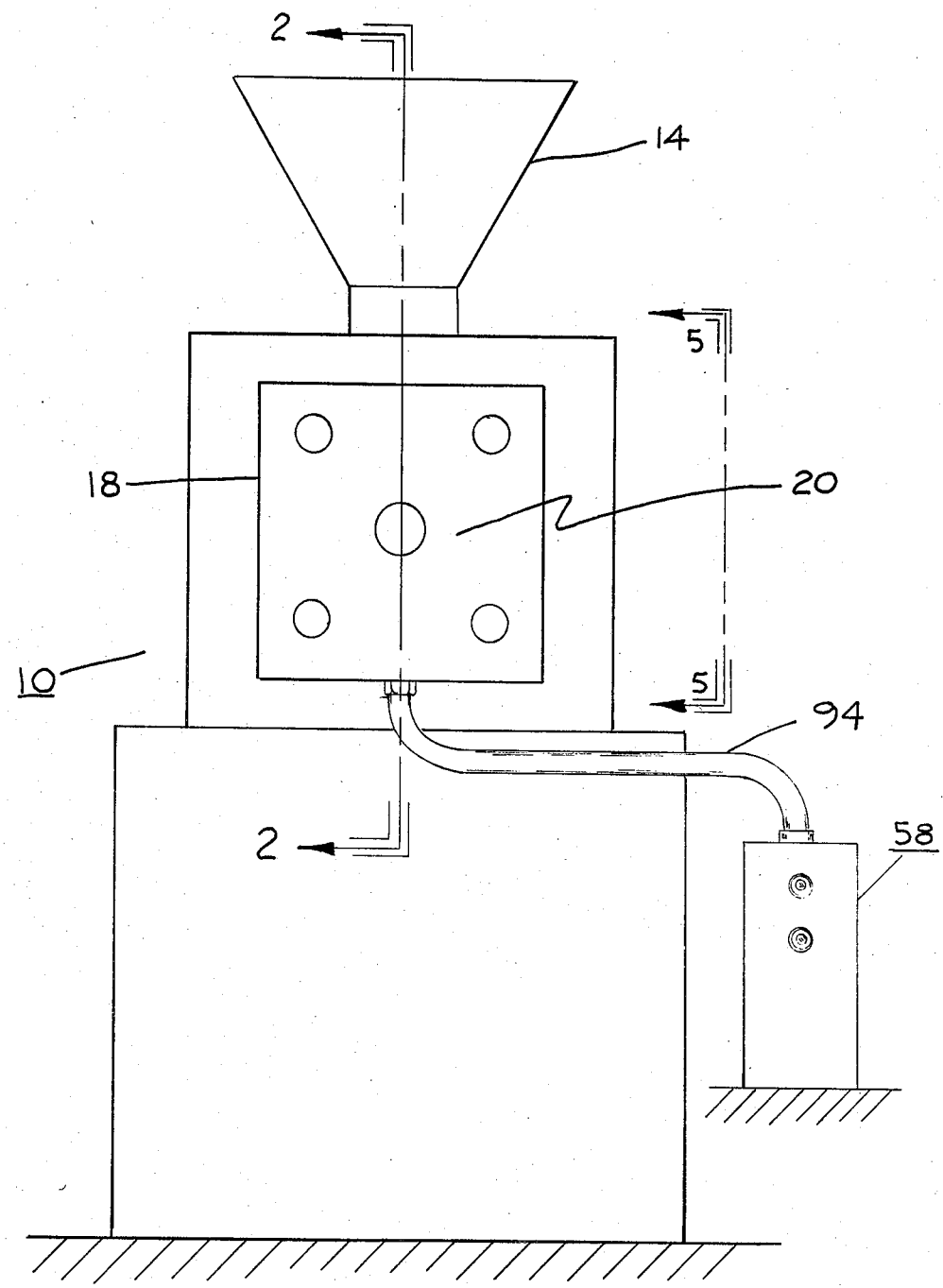
FIG. 1 represents an end view of an injection molding machine which incorporates the present invention.
Figure 2:
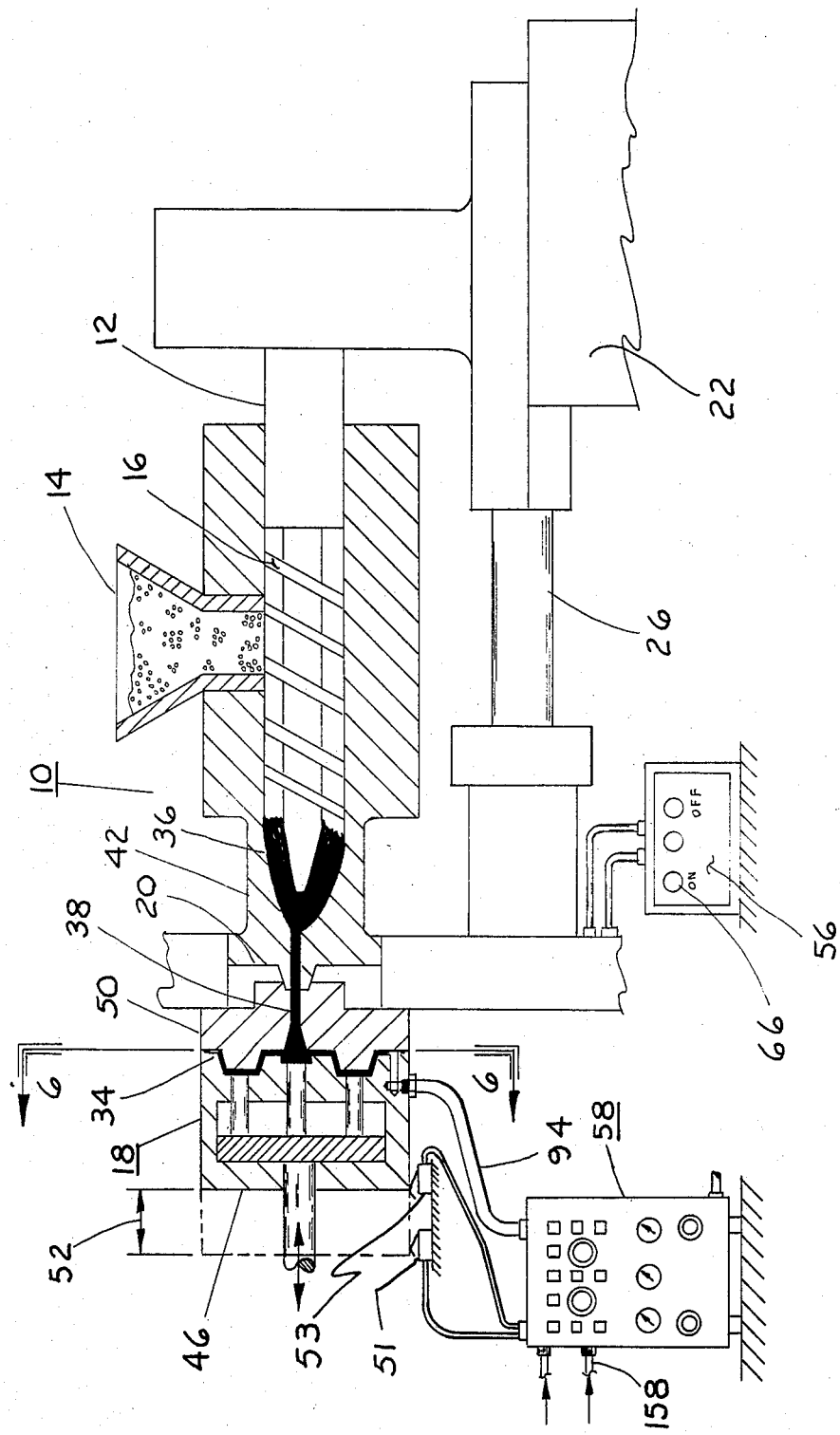
FIG. 2 represents a front sectioned view taken along the lines of 2—2 from FIG. 1 to illustrate the injection molding machine with a horizontally disposed cyclical injection molding die, with the female die member in operative association with the contol apparatus of the present invention.

Referring to FIG. 1 and FIG. 2 there is shown an injection molding machine 10 having a supply hopper 14 for holding a supply of plastic pellet material such as polypropylene. The injection molding machine 10 has a positive mechanical pump 12 which advances the plastic through rotation of an injection screw 16 toward the molding die portion of the machine 10. There is an injection molding die 18 located at one end 20 of the machine 10.

The injection molding die 18 is cyclically operated by a control device 22, generally represented in FIG. 2 which controls a hydraulic pull in cylinder 26. The hydraulic pull in cylinder 26 causes a predetermined opening and closing of the injection molding die 18, during a mold cycle of FIG. 3 within which the plastic is heated and injected into the die 18 to form plastic parts.

The injection molding die 18 has two principle major components, which are adapted to fit closely together when closed so as to provide a multi cavity mold cavity 34 therebetween. There is an inlet port 38, along which the plastic material is guided to the mold 34. The plastic material is positively advanced towards the mold cavity 34 by the injector screw 16, and there is a heating cyclinder 42 typically provided in such a molding machine and located in an area 36 within close proximity to the inlet port 38 of the multi cavity mold cavity 34. The plastic material is heated to a temperature depending upon the manufacturers recommendations. For example, polypropylene is heated by the heating cylinder 42 to a temperature ranging from 300 to 800 degrees Fahrenheit (F) as it is pushed towards the inlet port 38 by the injector screw 16. The heated plastic material flows into the waiting multi cavity mold cavity 34.

The injection molding die 18 has two major components, as previously mentioned which are illustrated in the present disclosure as a female die 46 and a male die 50. These components fit closely together, when operatively closed and normally close under control of the control device 22 to a condition where flat mating surfaces, (to be described in detail later in this specification) located at right angles to the direction of movement of the die members seat and seal against each other during the mold cycle. A mold cycle is typically referred to as one cycle where the male and female die members close, fill, open and eject one or more plastic molded parts from the mold. Within the present specification a mold cycle will be construed to mean the same, except that the mold cycle in the present invention is broken down into increments where varying degrees of vacuum and positive air pressure are applied to the mold cavity for predetermined intervals of time to cause desired positive effects to be described in more detail in the following specification.

In FIG. 2, there is shown a control apparatus 58 which is connected electrically and pneumatically to the injection molding machine 10 for the purposes of setting up, starting, and stopping the operation of the mold cycle in the injection molding machine 10 according to predetermined requirements which are governed by the material, manufacturers recommendations' the size of the part and the size of the mold cavity. The control device 22 has individual adjustable devices (not shown) for setting a distance 52 which the female die member 46 reciprocally moves through when the injection molding die 18 opens to eject the molded parts. There are limit switches 51 and 53 acuated by the female die 46 (to be discussed later) which are enabled by the extreme movement position of the pull in cyclinder 26 as controlled by the control device 22 which provide the desired open and close limiting positions of the female and male die member 46 and 50 during the mold cycle operation.

Figure 3:
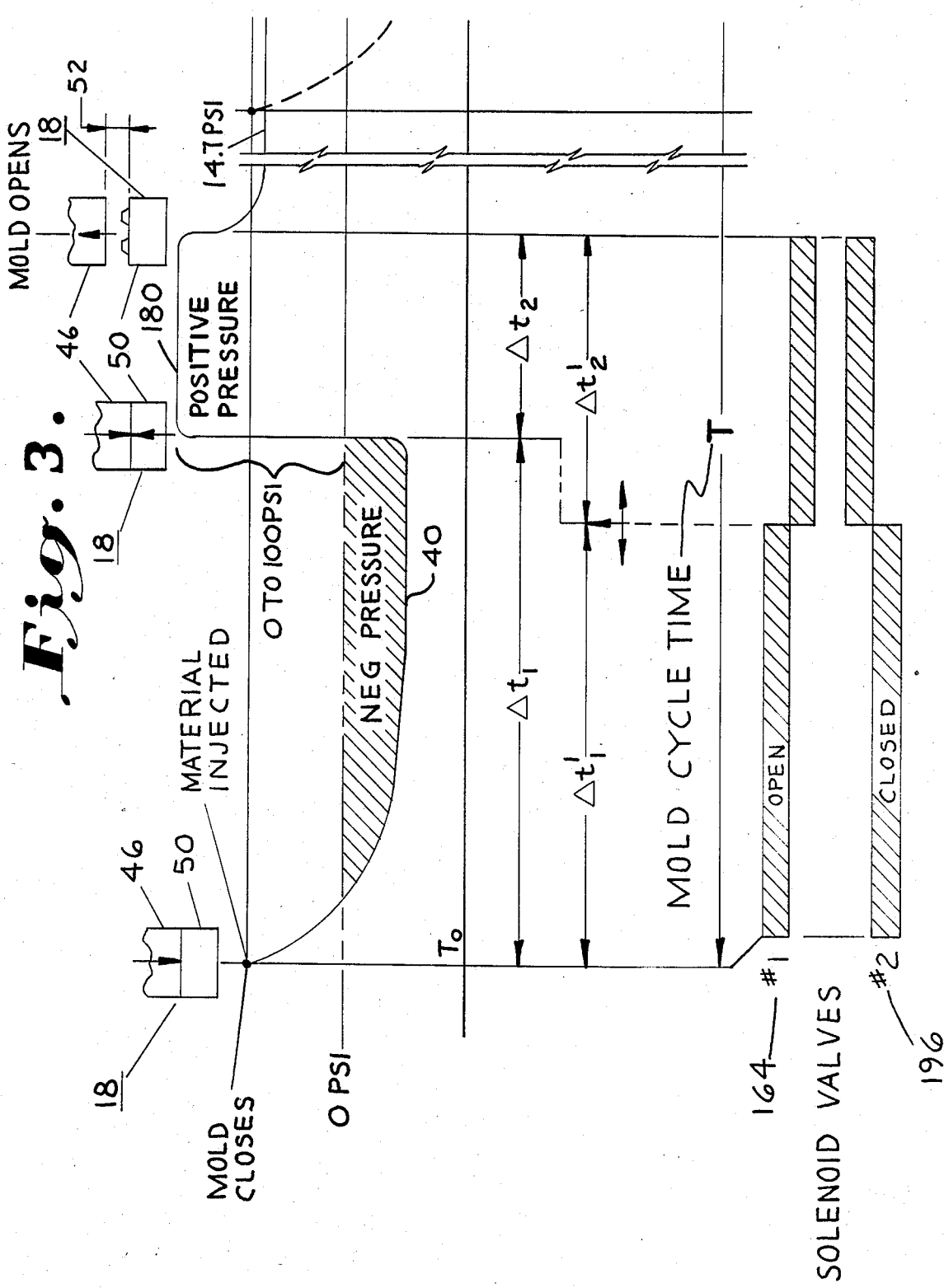
FIG. 3 represents a timing chart, showing a typical cyclic operation of the injection molding die of FIG. 2.

At this time, attention is directed to FIG. 3, in which a timing chart representative of mold cycle time is depicted. There is an overall time element T, which represents that period of time in an injection molding machine operation when one or more individual plastic parts are produced. At a time To, the injection molding die 18 is closed (FIG. 2) by activation of the control apparatus 58 when a start button 66 (FIG. 2), located on a control panel 56 associated with the molding machine 10, has been enabled by a machine operator. At this time, the heated thermoplastic material is injected into the multi cavity mold cavity 34. Simultaneously, there is a vacuum 40 applied to the multi cavity mold cavity 34 for a predetermined time interval $\Delta t_1$. The amount of vacuum applied will vary according to the mold size and the particular material being cast. The materials which have been used with the process being described that have given highly successful results are polyethysulphone and polypropylene. These materials are shot into the mold cavity under pressures which vary from 5000 to 50,000 psi, while the material is elevated to a temperature ranging from 300 to 800 degrees F. The amount of vacuum applied to the mold cavity can be varied from 0 in. Hg to 29 in. Hg (inches of mercury) in order to evacuate the mold cavity 34. The period of time that the vacuum is applied will nominally vary from 0.10 to 10 seconds. Depending upon the material, the size of the mold, and the fineness or thinness of the parts being cast longer or shorter times may be more appropriate. There are instrumentalities for controlling the amount of vacuum, and the duration of time the vacuum is applied as will be described later in the present specification. There is a short period of time during the $\Delta t_1$ time span when the vacuum is held at a constant level just before a positive pressure is applied to the mold cavity 34. Then there is a second time interval $\Delta t_2$ when the mold remains charged with the positive pressure, at a pressure range varying from 0 to 120 PSI and during a time extending nominally from 0.1 to 10 seconds. Again, depending on the material, the duration of the positive applied pressure is determined before hand and a further factor concerning the instant the mold opens is brought into the set up procedure. The factor in respect to the mold opening is essential to the process taught herein, since it has been experienced that the positive pressure applied causes the molded parts to incrementally and uniformly separate or eject from the surfaces of the mold cavity 34 while the positive pressure is maintained and directed into the mold cavity 34. At the same time, the posivite pressure causes the mold cavity 34 to be effectively cleaned during a cleaning phase, prior to beginning the next mold cycle. It should be mentioned at this point that the positive pressure applied, is supplied from a compressed air source which could be an alternate gaseous substance such as helium or nitrogen.

Briefly, the nature and details of the plastic parts will now be discussed insofar as the parts typically being manufactured which are considered to be highly critical with respect to wall thickness and tolerances. The parts molded with the present process have details ranging in size from 0.0002" to 0.010", which are very sensitive to state of the art molding techniques where gas burns, voids and blemishes are common. It has heretofore been difficult to consistently produce high volumes of such parts with such critical tolerances due to, the problems experienced and discussed above.

PREFERRED EMBODIMENT OF THE INVENTION APPLIED TO A MULTI CAVITY MOLD

Figure 5:
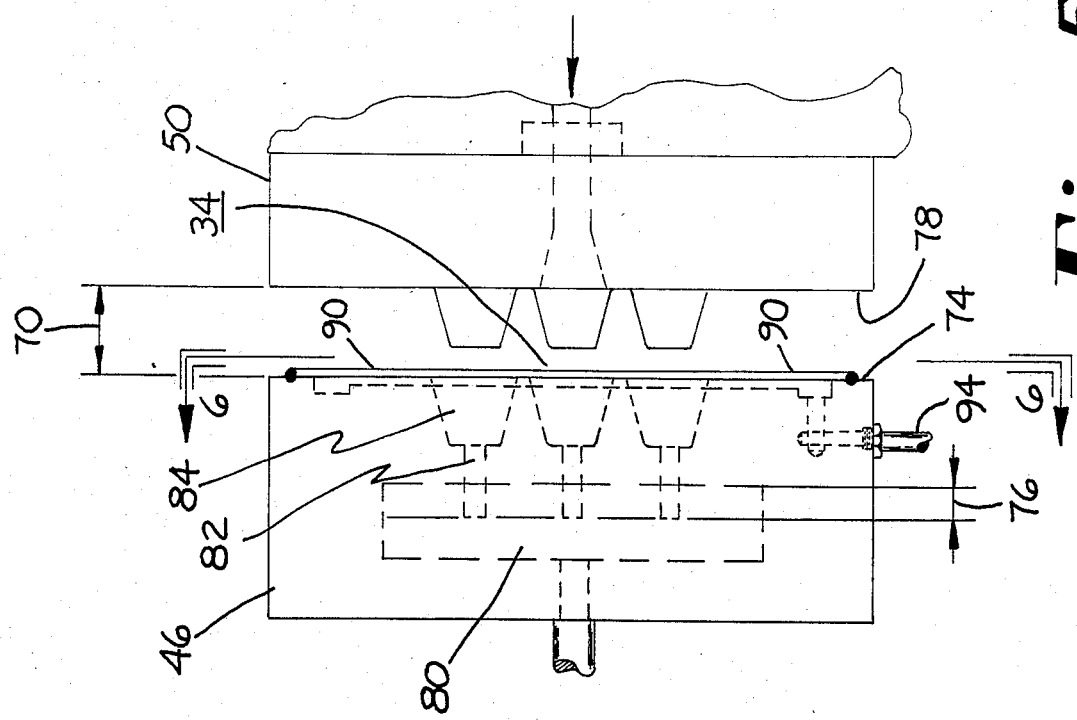
FIG. 5 represents an enlarged, partial frontal view of the injection molding die, (shown in FIG. 2), taken along the lines of 5—5 from FIG. 1 in order to illustrate the female and male die members in a fully separated mode of the mold cycle.

The details of application of the process and apparatus of the present invention will now be discussed as reference is made to the drawings and individual parts which control the molding process and form the invention. Referring to FIG. 5, there is shown an enlarged full frontal view of the injection molding die 18, as taken from FIG. 1 and 2. The female die member 46 is shown in the opened mode, (FIG. 5) being moved away from the male die member 50 such that there is a gap 70 between a face 74 of the female die member 46 and a face 78 of the male die member 50.

Figure 7:
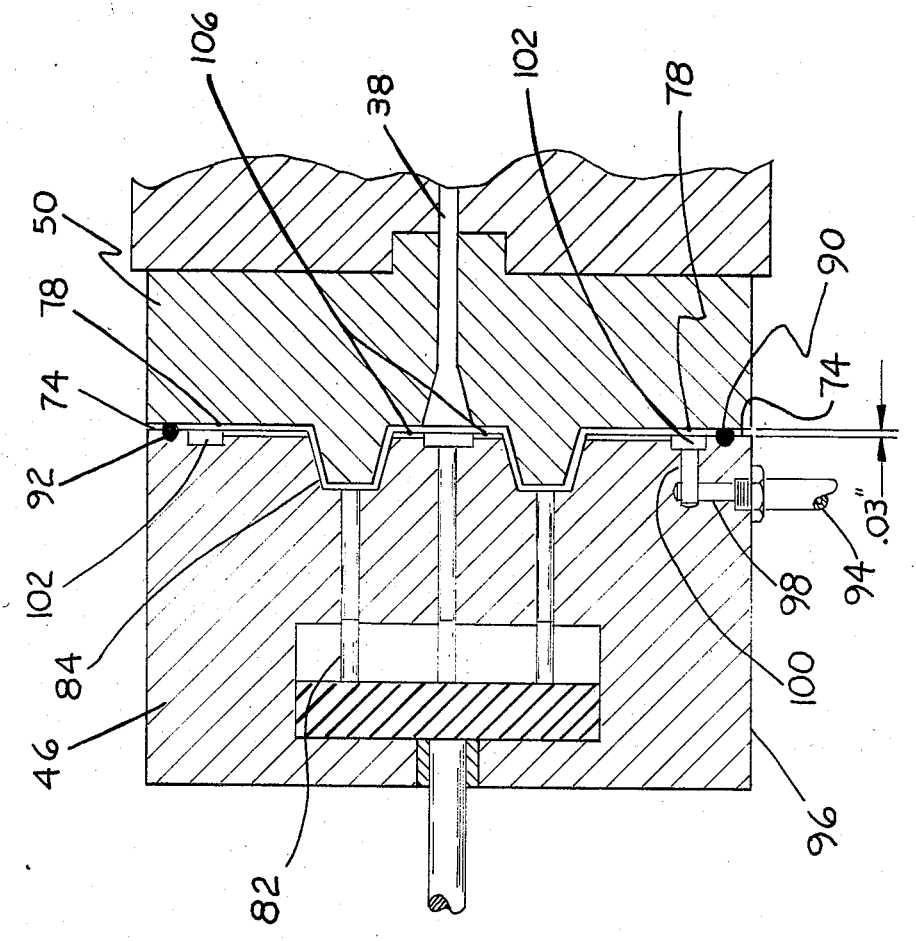
FIG. 7 represents a sectional view of the injection molding die as taken along the lines of 7—7 from FIG. 6 in order to illustrate the relationship of the sealing apparatus to the die members while the injection molding die is in the closed, operating mode.

The mold in the drawing FIG. 5 is representative of a multi cavity mold for forming 4 individual parts which in the present description will be recognized as being simple, very thin walled cups. Describing more of the instrumentalities of the injection molding die 18, there is an ejector pin apparatus 80 which is activated to move through a gap 76 at the latter stage of the mold cycle by apparatus associated with the previously described control device 22 and the pull in cylinder 26. There is a pin 82 located in a strategic location under a female mold cavity 84 such that the pin 82 physically engages a part having been formed in the mold cavity 84 (when the female die member 46 opens), and pushes to positively eject that part as other similar pins engage the remaining parts while the ejector pin apparatus 80 moves through a predetermined reciprocal cycle. When the female and male die members 46 and 50 are brought together by the aforementioned apparatus, the face 78 of the male die member 50 is engaged with the face 74 of the female die member 46, as is best seen in the sectional view FIG. 7. In FIG. 7, there is shown an "O" ring 90 which in the present mold will be defined as being a 0.125" "O" ring of suitable material such as "VYTON", being firmly implanted in an appropriate groove 92 machined into the face 74 of the female die member 46 to a sufficient depth such that a minor amount of the "O" ring 90 (about 0.030") protrudes above the face 74. It will be recognized that the groove 92 may be reversed such that the "O" ring 90 is implanted in the face 78 of the male die member 50 in order to achieve effect of resiliently sealing the cooperating die members during the actual molding process. The application of the "O" ring 90 may be replaced by a coating of RTV silicone, vacuum grease or the like, where a positive seal is provided, however it is felt that the "O" ring device as applied and described herein provides a more durable way of achieving the desired seal. Considering the portability of the control apparatus 58 disclosed in the present invention, the application of the "O" ring device will be noted as being readily adaptable to injection molding dies already in use. For example, in the event a reduction in the number of defects occuring without the benefits of the present invention or better tolerance control of the parts being molded is desired, an "O" ring may be easily applied to the mold along with the following described modifications, in order to apply the benefits of the present invention.

Figure 6:
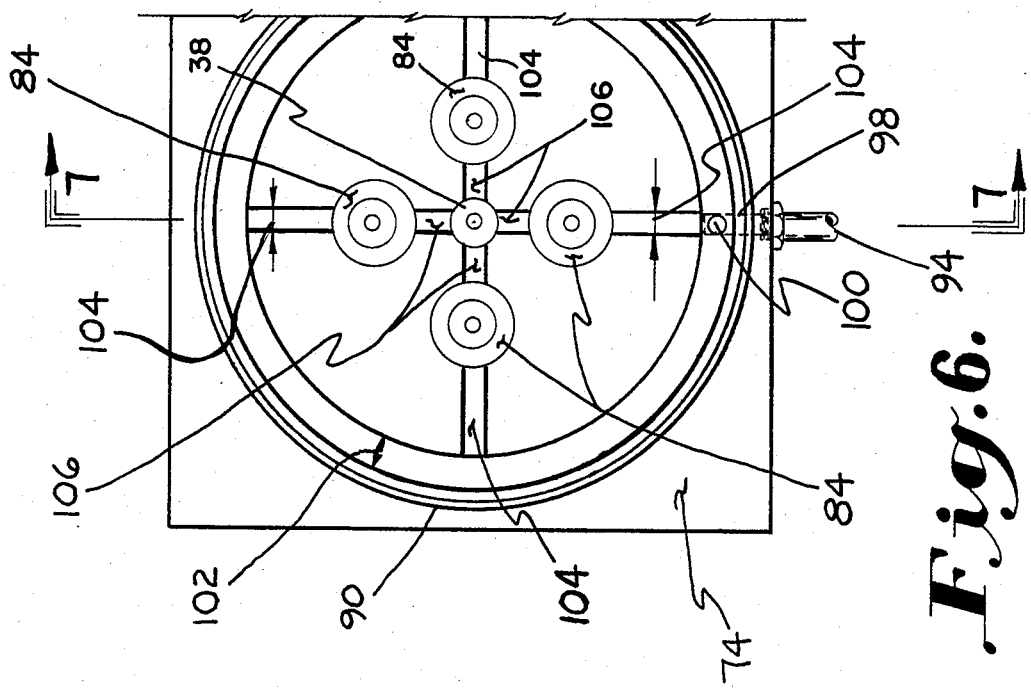
FIG. 6 represents an end view of the female injection molding die member as taken along the lines 6—6 from FIG. 5 in order to shown the details of a multi cavity mold cavity with a sealing and venting device applied thereto.

Referring back to FIG. 7, there is shown a pneumatic supply line 94 which is securely attached through a suitable commercial coupling fitting screwed into a $\frac{1}{8}$" to $\frac{1}{4}$" diameter National Pipe Thread (NPT) cut into a side wall 96 of the female die member 46. There is an elongate bored hole 98 machined in line with the supply line coupling fitting such that a bored hole 100 is intercepted by the bored hole 98. The bored hole 100 is positioned at a right angle with respect to the hole 98, and is applied from the face 74 of the female die member 46 such that the hole 100 is centered within a vent chimney ring groove 102, cut into the face 74 (FIG. 6 and FIG. 7). It will be noted that the vent groove is located just inside the "O" ring, at a convenient radial location on the mold face 78, and is radially bordered on the inside by each mold cavity 84. The vent groove 102 has an appropriate width and depth as do so all other gates and vents machined into the mold parts to allow the air and gases to properly be exhausted without any major problems. The locations of the gates and vents are also dependent on the number of parts within the mold cavity, but will be understood to be located for effective venting of the mold prior to, and during the injection of the molding media heretofore discussed. There is a shallower groove 104, (FIG. 6) 0.0005" to 0.005" deep) which is also cut into the face 74 of the female die member 46 such that the groove 104 intercepts each female mold cavity 84 and the vent chimney ring groove 102. The groove 104, and the chimney ring groove 102 provide an access way for evacuation of the air and gases as well as a pathway for applying the positive air pressure discussed previously in the description of the mold cycle. To allow the plastic material to enter each mold cavity 84, there is a sprueway 106, leading from the inlet port 38 to each mold cavity 84.

FIRST ALTERNATE EMBODIMENT OF THE INVENTION APPLIED TO AN INJECTION MOLDING DIE

Figure 8:
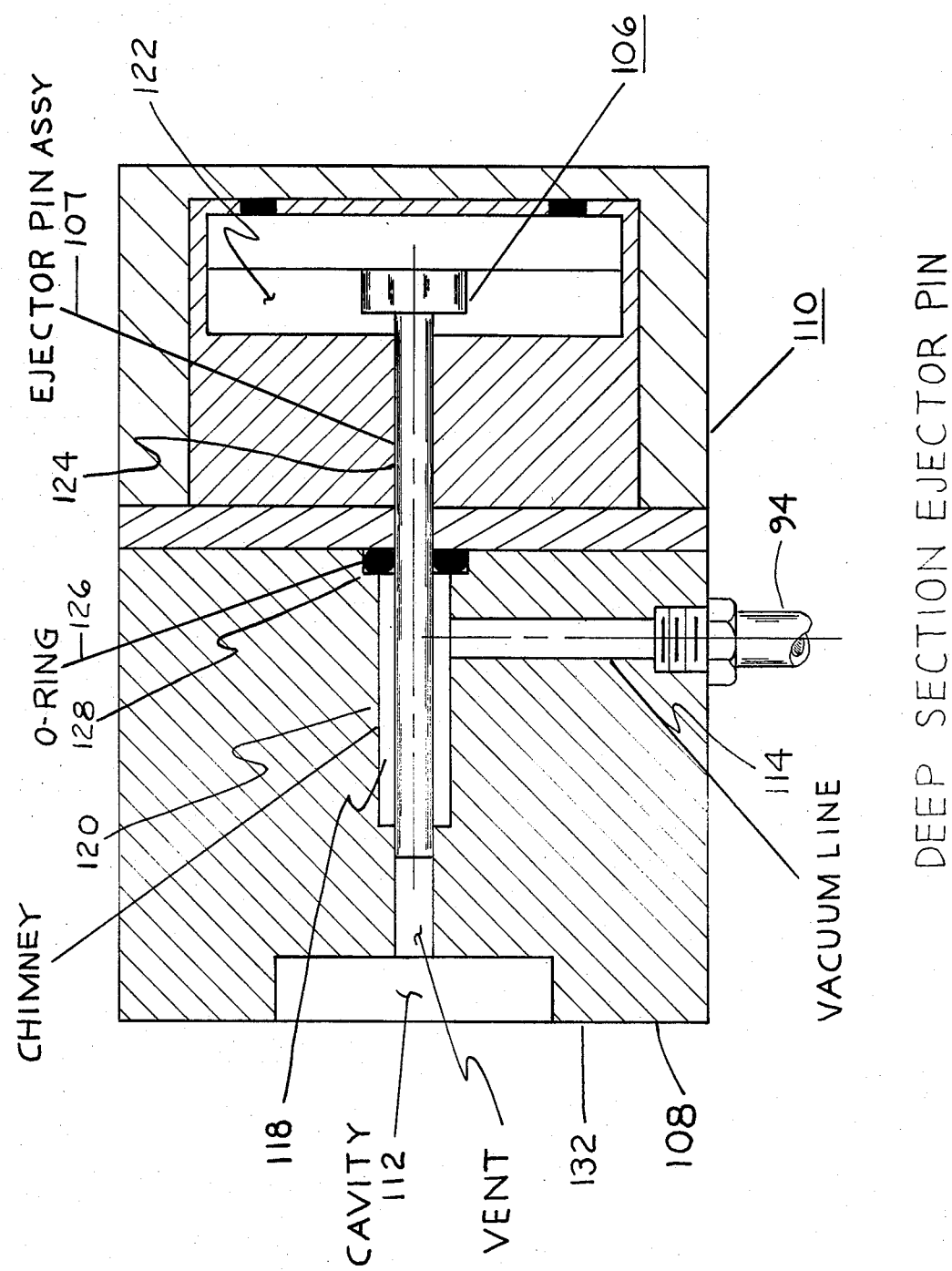
FIG. 8 represents a cross sectional view, taken along the same lines as the apparatus in FIG. 7, showing a first alternate embodiment of an injection molding die.

Referring to FIG. 8, there is shown a deep section ejector pin assembly 107, which is installed in a female die member 108 of an injection molding die 110. The operation of the injection molding die 110 is the same as that described for the injection molding die 18, except that the multi cavity mold cavity 34 is a single mold cavity 112 in this case, and there is a variation where a vent line enters the female die member 108 through a bored hole 114. The vacuum is applied to the female die member 108 through the pneumatic supply line 94 (same as FIG. 5), interconnecting through the bored hole 114 to a chimney vent hole 118 which is seen in a center portion 120 of the female die member half 108. The chimney vent hole 118 is bored concentrically in line with a deep section ejector pin holding member 122, which appropriately provides the guideway for an ejector pin member 124. There is an "O" ring 126 or other suitable seal provided at a section 128 of the female die member 108 such that the pneumatic supply line 94 is located between the single mold cavity 112, and the deep section ejector pin assembly 106. This therefore provides a pneumatic seal at the deep section ejector pin assembly 106 against pressure leakage. A coating of suitable RTV compound or the equivalent is placed on a mating mold surface 132, in order to seal the mold member faces, as previously described with the description of the injection molding die 18.

SECOND ALTERNATE EMBODIMENT OF THE INVENTION APPLIED TO AN INJECTION MOLDING DIE

Figure 9:
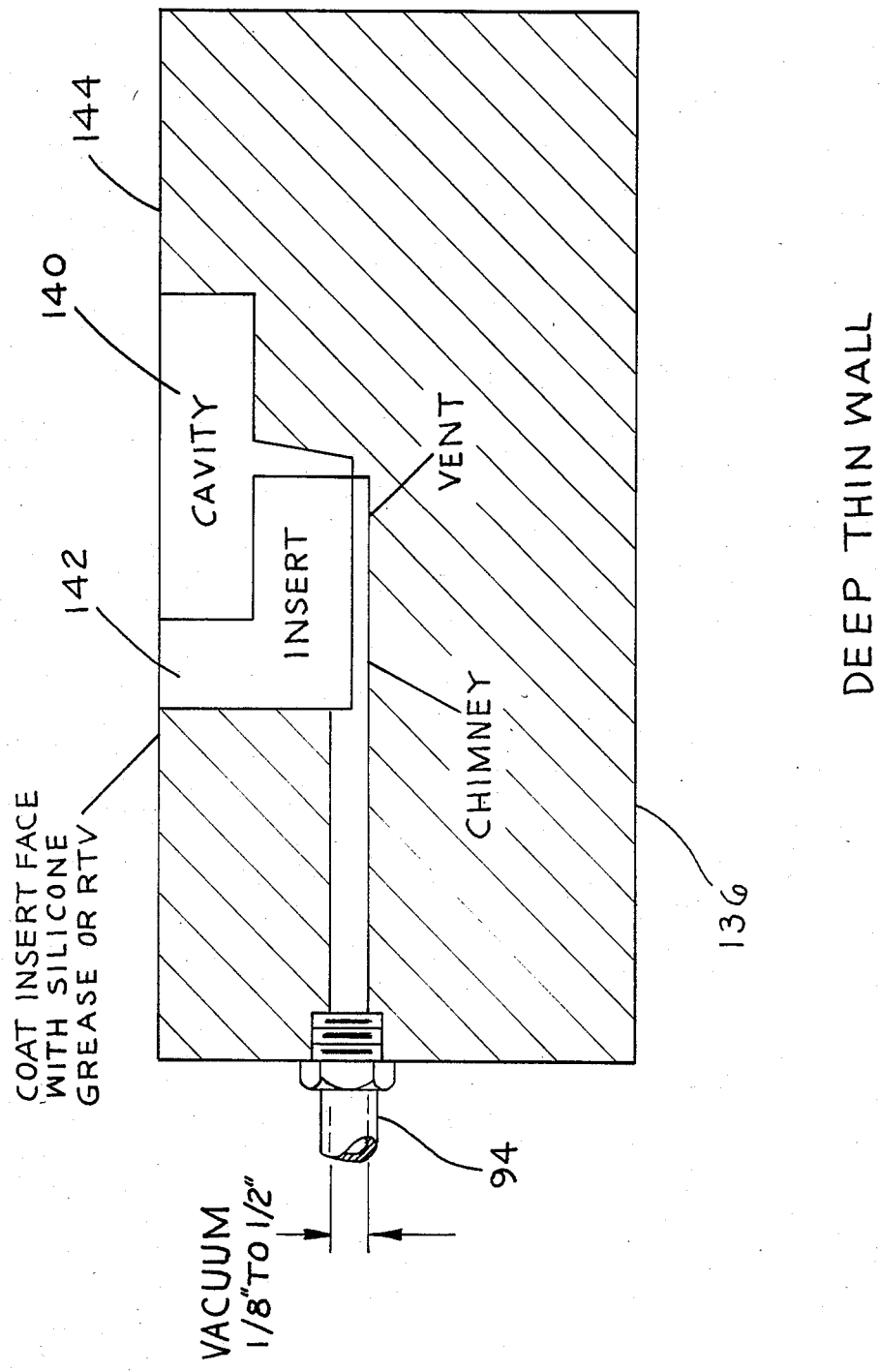
FIG. 9 represents a cross sectional view, taken along the same lines as the apparatus in FIG. 7, showing a second alternate embodiment of an injection molding die.

Referring to FIG. 9 there is shown a deep thin wall mold application where a female mold member 136 is depicted as a variation of how to apply a vacuum to an injection molding die having a relatively deep mold cavity with the molded parts having thin walls and deeply drawn sections. Again, as in the first alternate embodiment, the female mold member 136 is intended to illustrate a variation in the application of the vacuum to a mold cavity such as that described earlier in reference to the multi cavity mold cavity 34. In this case however, there is described a single cavity 140 and in addition, an insert 142 is applied to the single cavity 140. There is not an enjector pin assembly shown in FIG. 8, since the process being described herein is sufficient to eject the molded part formed in the single cavity mold 140 when the positive pressure (FIG 3) is applied during the cleaning phase of the mold cycle. And, it will be evident to those understanding the application that it is possible and desirable to apply the previously discussed "O" ring sealing members, or RTV compound, to a surface 144 of the female mold member 136 by the manner previously described to achieve an adequate seal during the molding process.

DESCRIPTION OF THE CONTROL APPARATUS FOR THE PREFERRED EMBODIMENT

Figure 4:
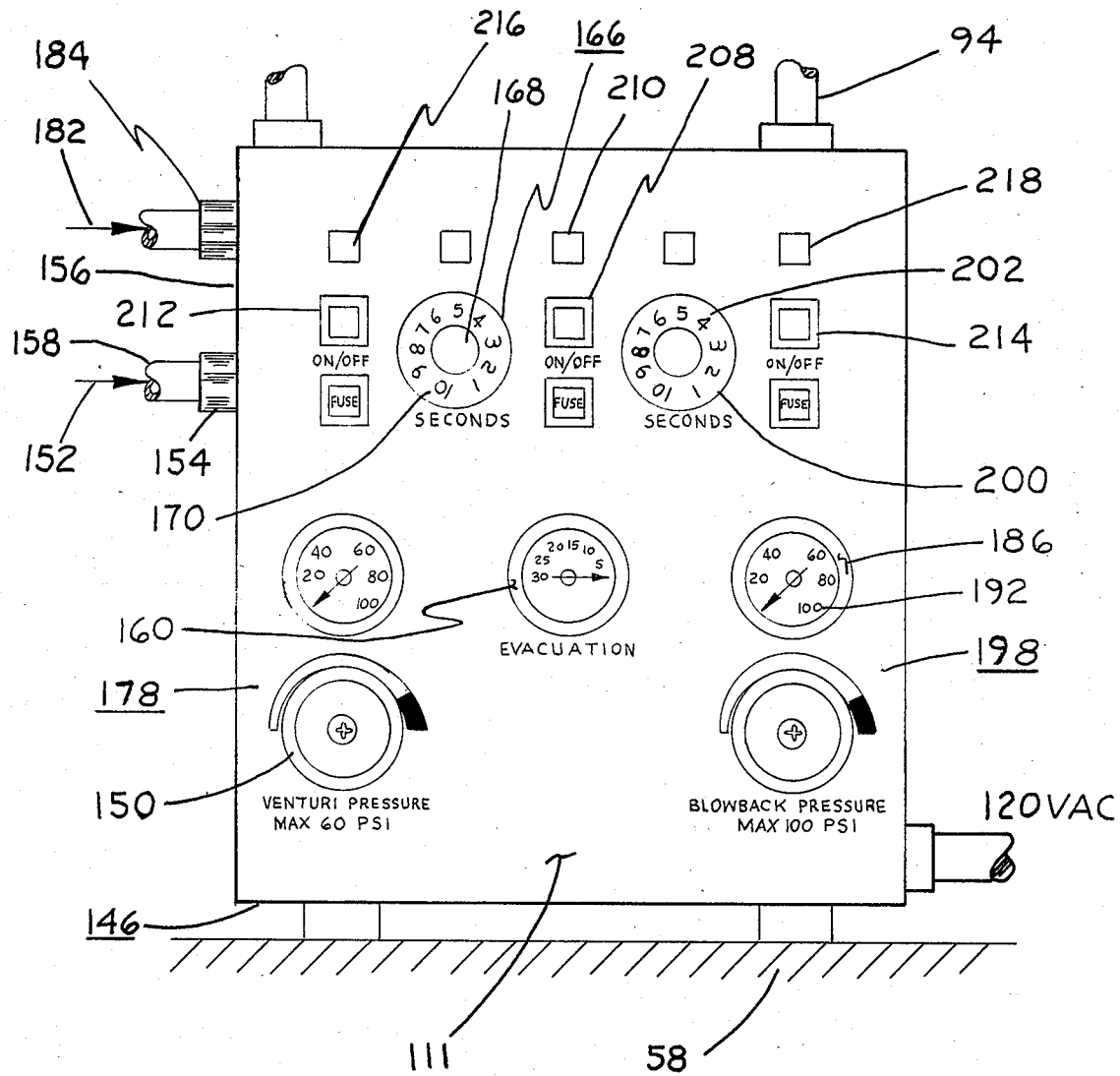
FIG. 4 represents an enlarged frontal view of the control apparatus of FIG. 2.

Referring to FIG. 4, there is shown a greatly enlarged view of the instrumentalities of the control apparatus 58 which constitutes the portable, programable device for setting the time increments and air pressure levels briefly discussed earlier herein. The control apparatus 58 and the various instrumentalities therein is essentially contained within a small, convienient self contained box 146 which has an appropriate panel 111 for securely mounting all of the components including gauges, wiring, tubing, switches and operator settable timing devices. In the set up of the injection mold cycle, the control apparatus 58 is set up by following a sequence of steps which parallel the operations defined in the accompanying description of the mold cycle.

Figure 10:
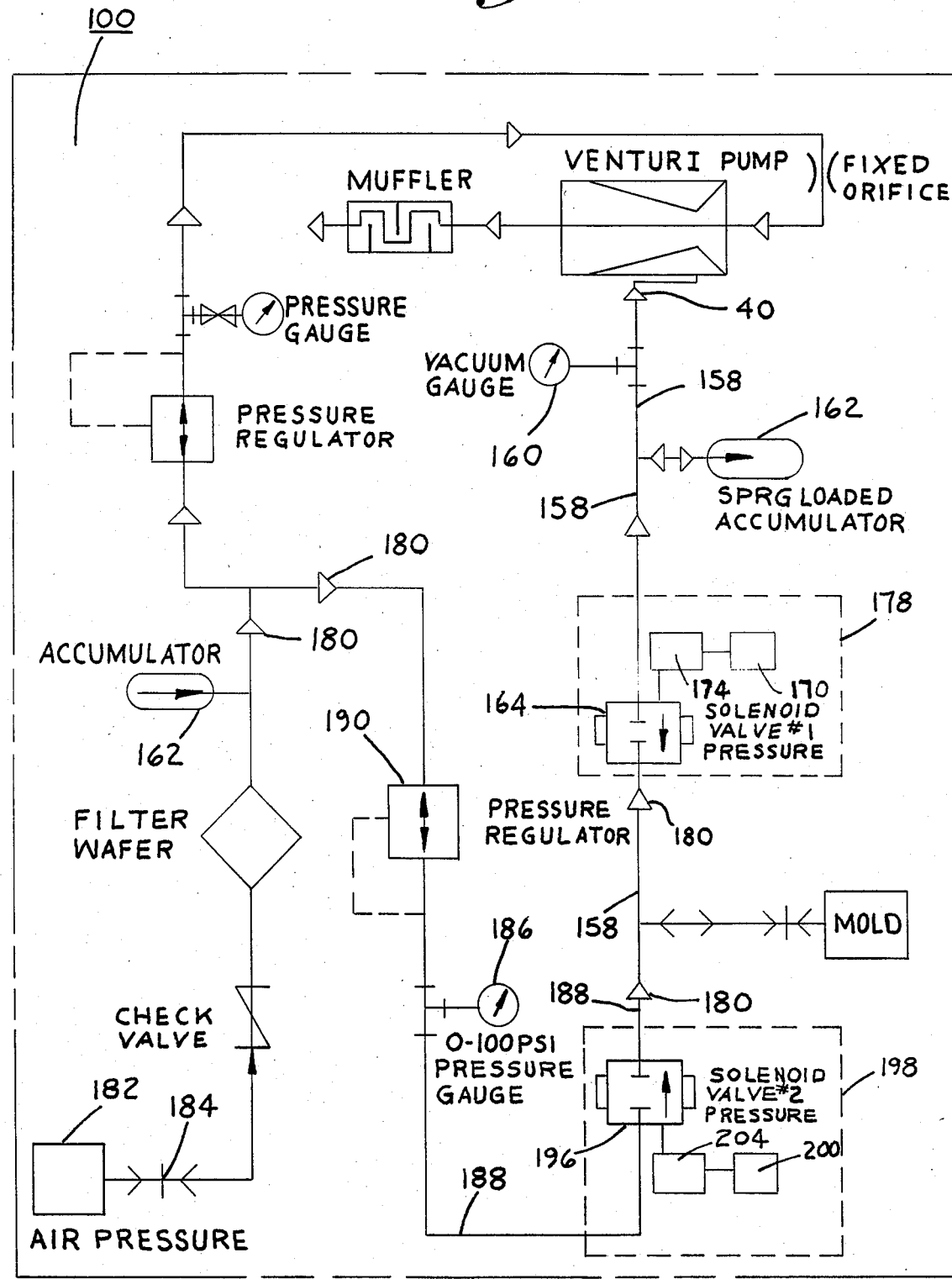
FIG. 10 represents a pneumatic schematic of the pressure control apparatus of the present invention.

Initially, the operator will set a first control apparatus 178 which includes a number of components and features included therein relative to the present invention. It will be understood by those skilled in the art that the control apparatus 58, as provided in the present invention is adequately packaged within the self contained box 146 along with the instrumentalities to now be explained. It is felt that the packaging of the referenced instrumentalities is best shown in a schematic form (FIGS. 10 and 11) since it is difficult to illustrate such components in their final assembled, closely packed form, with the required pneumatic tubing, electrical harness and so forth operatively connected, and squeezed together to a satisfactory operating unit. For example, there is a venturi pressure adjusting device 150 for adjusting the level of vacuum to be applied to the multi cavity, mold cavity 34, and an outside vacuum source 152 (FIG. 4 and FIG. 10) connected to a suitable port 154 in a wall 156 through a first pneumatic supply line 158. There is a vacuum gauge 160 connected to the first pneumatic supply line 158 for monitoring negative pressure levels and there is an accumulator 162 (FIG. 10) for regulating the negative pressure level to a desired level. There is a first electromagnetic solenoid valve 164 (FIG. 10) connected in series to the first pneumatic supply line for maintaining a flow path of the negative air pressure to the multi cavity mold cavity 34 during the first time interval $\Delta t_1$. There is a first adjusting apparatus 166 for adjusting the first time interval $\Delta t_1$, to a first predetermined time interval $\Delta t_1^1$, within the mold cycle T to cause the first electromagnetic solenoid valve 164 to open from a closed position (FIG. 3) within which the substantially constant negative pressure (vacuum 40) applied to the multi cavity mold cavity 34 has effectively removed the undesired gas and vapor therefrom. The first adjusting apparatus 166 includes a first incrementally adjustable manual time setting device 168 which has an incremental scale 170 ranging from (instantaneous to 10 seconds) with which to set a first control delay device 174 (FIG. 10). Longer times maybe desirable depending on materials, application and cycle times.

The electrical connections of the foregoing components will be discussed in detail later within the present specification and at this time it will be mentioned that the pneumatic supply lines discussed herein are understood to be applied, and attached to the components described with commercial standard hardware, tubing and connecting devices which are known and used by those skilled in the art.

There is a second control apparatus 198 included in the control apparatus 58 which delays reversing the constant negative air pressure defined heretofore, to a positive air pressure 180 (FIG. 3), under the section of the mold cycle denoted $\Delta t_2^1$. The second control apparatus 198 includes apparatus to be defined in the following specification for maintaining the positive air pressure 180 at a level sufficiently high enough during the second time interval $\Delta t_2$ of the mold cycle to cause a predetermined incremental uniform separation of the plastic parts from the female and male die member 46 and 50. The instant that the predetermined incremental, uniform separation occurs is at a predetermined increment of time substantially close to that latter portion of the mold cycle when the injection molding die initially opens after the parts are molded. The second control apparatus 198 includes the following components and instrumentalities for adjusting the second time interval $\Delta t_2$. There is a positive air supply 182 provided from an appropriate outside source, and brought into the control apparatus 58 at a suitable connecting port 184 located on the wall 156 of the self contained box 146. There is a pressure guage 186 connected to a second pneumatic supply line 188 (FIG. 10) and to the positive air supply 182 as is a pressure regulator 190 (FIG. 10) in order to regulate the positive air pressure 180 to a predetermined elevated level. The pressure gauge 186 has a scale 192 (FIG. 4) of from 0 to 100 psi. There is a second electromagnetic solenoid valve 196 (FIG. 10) connected to the second pneumatic supply line 188 for maintaining a flow path of the positive air pressure 180 to the multi cavity mold cavity 34. There is a second adjusting apparatus 200 for adjusting the second time interval $\Delta t_2^1$ to a second predetermined time interval $\Delta t_2$ such that the positive air pressure 180 is applied to the multi cavity mold cavity 34 when the second electromagnetic solenoid valve 196 opens at the end of the first predetermined time interval $\Delta t_1$ at substantially the same time as the first electromagnetic solenoid valve 164 is closing. The second adjusting apparatus 198 includes a second, incrementally adjustable manual time setting device 200 having an incremental scale 202 ranging from 0 to 10 seconds. The manual time setting device 201 is operatively connected to the second control delay device 204 (FIG. 11) for causing the first electromagnetic solenoid valve 164 to close at the end of the first predetermined time interval $\Delta t_1$.

DESCRIPTION OF THE ELECTRICAL OPERATION OF THE CONTROL APPARATUS, (THE PREFERRED EMBODIMENT)

Figure 11:
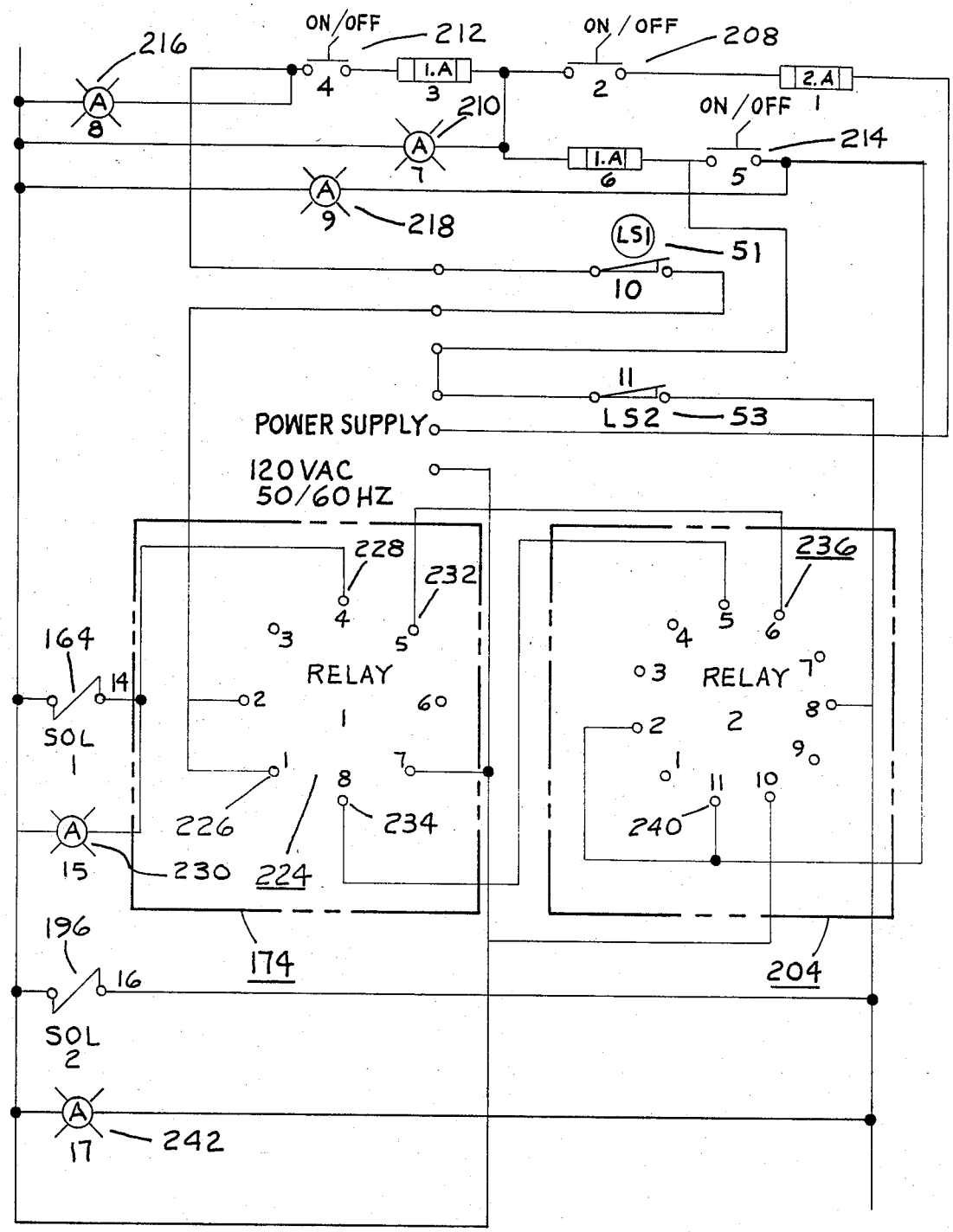
FIG. 11 represents an electrical schematic of the pressure control of apparatus of the present invention.

Referring to FIG. 11, there is shown an electrical schematic representative of the control apparatus 58 instrumentalities for causing the previously described cyclic operation of a mold cycle in increments. Reference should be made to FIGS. 3, 4 and 10 as need may be to aid in identifying the parts of the apparatus 58 as they relate to the molding machine and especially to the injection molding die 18.

The control apparatus 58 is operated on a 120 V AC power line as previously mentioned. To begin operation, a main power switch 208 is enabled by an operator. When switch 208 is enabled, a neon lamp 210 is illuminated. At this time, the enabling switch for the first control apparatus 178 and the second control apparatus 198 are enabled. This is only done at start up or initial set up of the molding operation. A switch 212 for the first control apparatus 178, and a switch 214 for the second control apparatus are thereby enabled. Accordingly, a neon indicator lamp 216 and a lamp 218 for the respective first control apparatus 178 and second control apparatus 198 give the operator positive indication of the steps taken to this point.

As the mold cycle begins, at the beginning of the mold cycle T (FIG. 3) the switch 51 which is normally open, closes as it detects motion of the female die member 46, to the point where the male mold member 50 is engaged, but not at the point where full clamping force is exerted between the aforementioned mold members. As noted, the pull in cylinder 26 effects the mold member clamping pressures. At the time that the switch 51 is enabled, a relay 224 is energized, (FIG. 11). And, the preset first time interval $\Delta t_1$ (FIG. 3) is activated as described earlier during adjustment of the first adjusting apparatus 166. Power is supplied to a terminal 226 of the relay 224 which is normally closed with a terminal 228 of the same relay to cause actuation of the first electromagnetic solenoid valve 164. There is an indicator lamp 230 which illuminates while the solenoid valve 164 is actuated and, as a vacuum is applied to the mold cavity 34.

When the time interval $\Delta t_1$ has been reached, the relay 224 switches to the open position, thereby causing de-energization of the solenoid valve 164 thereby closing the valve 164. The progress of the foregoing events will be evident to the operator, since the indicator lamps follow the components as they are enabled or disabled. (The lamp 230 is turned on when the valve 164 reopens for example), At the end of $\Delta t_1$ (a time out condition), a terminal 232 and 234 of the relay 224 opens from their normally closed position.

At this time, a relay 236 is enabled, thereby initiating the $\Delta t_2$ time interval sequence previously described. Simultaneously, the $\Delta t_1$ time interval sequence ends and a time delay contact 238 and 240 of the relay 236 closed from an normally open position, thereby causing the second electromagnetic solenoid valve 196 to open, while a lamp 242 illuminates. The solenoid valve 196, and corresponding indicator lamp 242 remain in the foregoing described state until the mold members 46 and 50 separate. Switch 53 which is normally open closes when mold members 46 and 50 have achieved a fully opened state. When switch 53 closes the solenoid valued 196 opens. A positive air pressure 180 is applied through valve 196 to the spruway 106 when the mold members 46 and 50 are fully open. The positive air pressure is continued while the mold halves 46 and 50 are open to their limit and the parts are ejected from the mold 34, thus cleansing the sprucway 106.

What is claimed:

1. An apparatus for controlling operating pressure during predetermined increments of time in a mold cycle for producing intricate and thin wall plastic parts formed within a cyclical injection molding die operatively associated with an injection molding machine, said apparatus comprising:
   A. a mold cavity located between a mating male and female die member of said cyclical injection molding die, said mold cavity having an inlet port for receiving a heated thermoplastic material,
   B. a sealing device for insuring an airtight bond between said mating male and female die member during said mold cycle when said cyclical injection molding die is closed,
   C. a venting path for operatively applying a sustained negative pressure to said mold cavity during a first time interval beginning after said cyclical injection molding die has closed and before said cyclical injection molding die has filled with said heated thermoplastic material,
   D. first control means for maintaining a substantially constant negative pressure within said mold cavity during said first time interval of said mold cycle while said intricate, and thin walled parts are being formed,
   E. second control means for reversing said substantially constant negative air pressure to a positive air pressure and for maintaining said positive air pressure at a level sufficiently high enough during a second time interval of said mold cycle to cause a predetermined incremental and uniform separation of said intricate and thin walled plastic parts from said male and female die member at a predetermined increment of time substantially close to that portion of time in said mold cycle when said cyclical injection molding die initially opens, and
   F. means for resetting said first and second control means to an initial condition whereupon a succeeding mold cycle will be started.

2. An apparatus as set forth in claim 1 wherein said first control means for maintaining said substantially constant negative pressure includes:
   A. an adjustable vacuum source, connected to said mold cavity of said cyclical injection molding die through a first pneumatic supply line,
   B. a vacuum gauge, connected to said first pneumatic supply line for monitoring said negative pressure,
   C. an accumulator, connectd to said first pneumatic supply line for regulating said substantially constant negative pressure,
   D. a first electromagnetic solenoid valve, connected to said first pneumatic supply line for maintaining a flow path of said substantially constant negative air pressure to said mold cavity of said cyclical injection molding die during said first time interval, and
   E. means for adjusting said first time interval to a first predetermined time interval within said mold cycle to cause said first electromagnetic solenoid valve to close, after undesirable gas and vapor resulting from injecting said heated thermoplastic material into said mold cavity, has been evacuated by said substantially constant negative pressure supplied through said first pneumatic supply line.

3. An apparatus as set forth in claim 1 wherein said second control means for reversing said substantially constant negative air pressure includes:
   A. a positive air pressure supply, connected to said mold cavity of said injection molding die through a second pneumatic supply line which is further connected to said first pneumatic supply line,
   B. a pressure gauge, connected to said second pneumatic supply line for monitoring said positive air pressure,
   C. a pressure regulator, connected to said second pneumatic supply line for regulating said positive air pressure during said second adjustable time interval,
   D. a second electromagnetic solenoid valve, connected to said second pneumatic supply line for maintaining a flow path of said positive air pressure to said mold cavity during said second time interval,
   E. means for adjusting said second time interval to a second predetermined time interval such that said positive air pressure supply is applied to said mold cavity when said second electromagnetic solenoid valve opens at the end of said second predetermined time interval after said first electromagnetic solenoid valve has closed.

4. An apparatus as set forth in claim 2 wherein said means for adjusting said second time interval to said first predetermined time interval, includes:
   A. a first control delay device, operatively connected to said first electromagnetic solenoid valve for causing said first electromagnetic solenoid valve to close at the end of said first predetermined time interval, and
   B. a first incrementally adjustable manual time setting device for setting said first electromagnetic solenoid valve to close at the end of said first predetermined time interval.

5. An apparatus as taken from claim 3 wherein said means for adjusting said second time interval to said second predetermined time interval includes:
   A. a second control delay device, operatively connected to said second electromagnetic solenoid valve for causing said second electromagentic solenoid valve to open at the beginning said first predetermined time interval, and
   B. a second, incrementally adjustable manual time setting device for setting said second electromagnetic valve to open at the end of said second predetermined time interval.

6. An apparatus as set forth in claim 1 wherein said means for resetting said first and second control means includes; a resettable relay for each of said first and second control means.

7. An apparatus as set forth in claim 1 wherein said sealing device comprises an "O" ring, which is permanently inserted into a machined groove surrounding said mold cavity of said injection molding die such that said machined groove is located in said female die member of said injection molding die.

8. An apparatus as set forth in claim 1 wherein said sealing device comprises an "O" ring, which is permanently inserted into a machined groove surrounding said mold cavity of said injection molding die such that said machined groove is located in said male die member of said injection molding die.

* * * * *